United States Patent
Bailey et al.

(10) Patent No.: US 7,100,567 B1
(45) Date of Patent: Sep. 5, 2006

(54) METHOD TO EXTEND LEAN IGNITION LIMIT WITHIN INTERNAL COMBUSTION ENGINE

(75) Inventors: Brett Bailey, Peoria, IL (US); Scott Fiveland, Peoria, IL (US); Weidong Gong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/093,319

(22) Filed: Mar. 30, 2005

(51) Int. Cl.
*F02B 19/00* (2006.01)

(52) U.S. Cl. .................. 123/268; 123/280; 123/48 AA

(58) Field of Classification Search .............. 123/253, 123/259, 48 AA, 78 A, 78 AA, 268, 280, 123/286
See application file for complete search history.

(56) References Cited

U.S. PATENT DOCUMENTS

| | | | | |
|---|---|---|---|---|
| 3,970,056 | A | * | 7/1976 | Morris ..................... 123/48 D |
| 4,033,304 | A | * | 7/1977 | Luria ....................... 123/78 A |
| 4,286,552 | A | * | 9/1981 | Tsutsumi ............... 123/48 AA |
| 4,516,537 | A | * | 5/1985 | Nakahara et al. ....... 123/48 AA |
| 4,987,863 | A | * | 1/1991 | Daly ..................... 123/48 AA |
| 5,115,775 | A | * | 5/1992 | Gruenwald ................. 123/292 |
| 5,560,326 | A | * | 10/1996 | Merritt .................. 123/51 AA |
| 5,947,076 | A | | 9/1999 | Srinivasan et al. |
| 6,286,468 | B1 | * | 9/2001 | Warren .................. 123/48 AA |
| 6,302,067 | B1 | * | 10/2001 | Merritt ..................... 123/48 D |
| 6,427,643 | B1 | * | 8/2002 | Dixon ..................... 123/48 A |
| 6,668,788 | B1 | * | 12/2003 | Agama et al. ............. 123/254 |
| 6,848,413 | B1 | * | 2/2005 | Suder et al. ................ 123/286 |

* cited by examiner

*Primary Examiner*—John T. Kwon
(74) *Attorney, Agent, or Firm*—Michael L. Woods; Alan J. Hickman

(57) ABSTRACT

A method of operating an internal combustion engine is provided. The engine includes a main combustion chamber in fluid communication with a prechamber. The method comprises the step of varying the volume within the prechamber during a portion of a compression stroke of the main combustion chamber.

11 Claims, 4 Drawing Sheets

Fig_2_

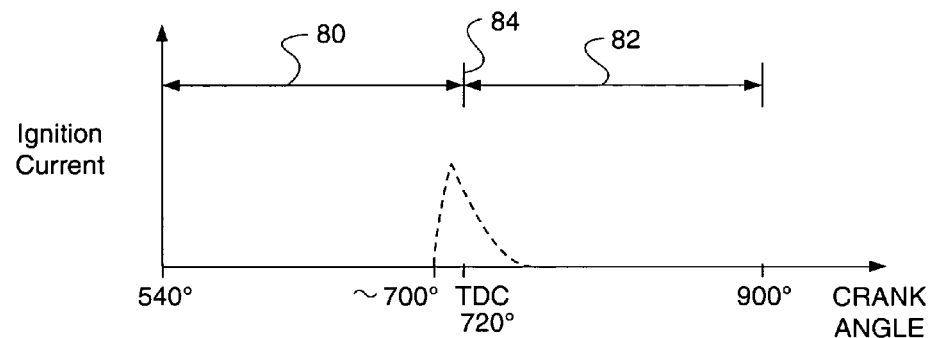
Fig-4-
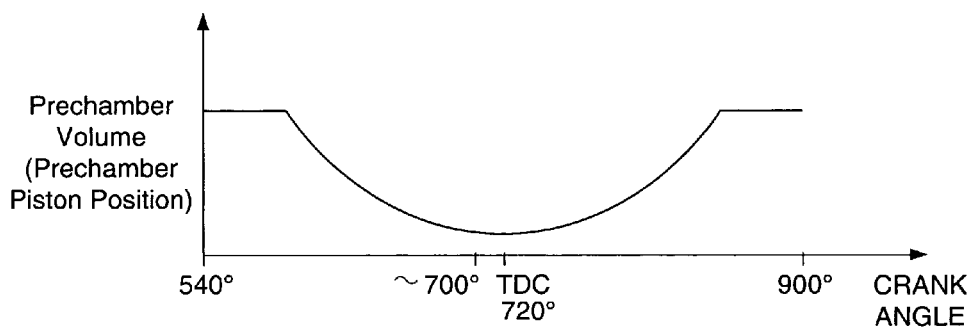
Fig-5-
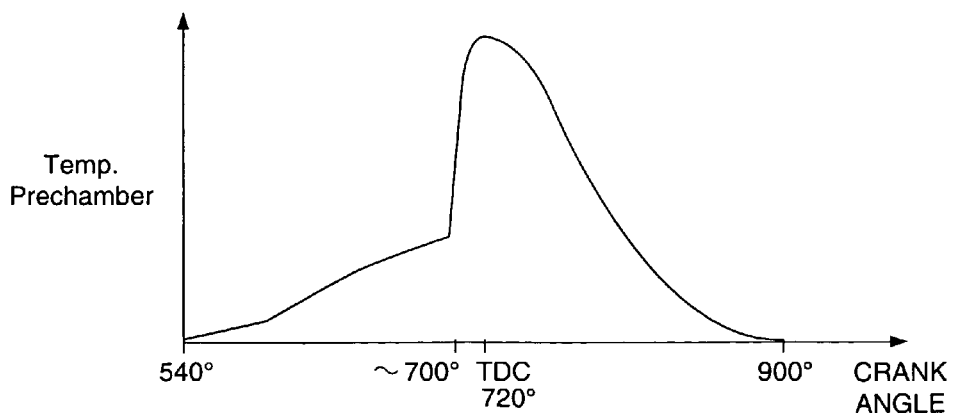
Fig-6-

METHOD TO EXTEND LEAN IGNITION LIMIT WITHIN INTERNAL COMBUSTION ENGINE

TECHNICAL FIELD

The present invention relates generally to a method for extending the lean ignition limit within an internal combustion engine.

BACKGROUND

Internal combustion engines often emit harmful oxides of nitrogen ("$NO_x$") during operation. These oxides form when nitrogen and oxygen, both of which are present in the air used for combustion, combine within the main combustion chambers. Typically, the level of $NO_x$ formed increases as the peak combustion temperatures within the combustion chambers increase. As such, minimizing the peak combustion temperatures within the main combustion chambers generally reduces the emission of $NO_x$.

For this reason, leaner gas or leaner gaseous fuel mixtures are used for reducing the peak combustion temperatures in the main combustion chambers, thus reducing the amount of harmful $NO_x$ emitted. A lean gas or gaseous fuel mixture has a relatively large air-to-fuel ratio when compared to a gas mixture having a stoichiometric air-to-fuel ratio. Accordingly, using more air in the fuel mixture may advantageously lower $NO_x$ emissions.

Unfortunately, using a lean air-to-fuel ratio may result in incomplete combustion within the main combustion chamber, especially in engines with large bores, due to the relatively slow rate of flame propagation from a single point ignition source, such as a spark plug. Furthermore, turbulence within the main combustion chamber may extinguish the ignition flame before the lean gas or gaseous fuel combusts. If the ignition flame extinguishes prior to complete combustion, the power output of the engine reduces and the amount of uncombusted fuel emitted increases.

To minimize the occurrence of incomplete combustion, some internal combustion engines incorporate a precombustion chamber, or prechamber. These prechambers may be in fluid communication with the main combustion chambers of the engine via small orifices. Either enriched or non-enriched fuel may be advanced in these prechambers. Ignition of the fuel within the prechamber creates a front of burning fuel that is jetted through the orifices and into the main combustion chamber, thus igniting the lean fuel within the main combustion chamber. The front of burning fuel jetting out of the orifices is generally sufficient to cause complete combustion of the lean fuel within the main combustion chamber.

These prechambers, however, do not have adjustable volumes that may vary as a function of different engine operating conditions.

As engine load changes, it is desirable to vary the volume of the prechamber to control momentum formation and gas jet penetration during combustion. Varying the volume of the prechamber results in more repeatable combustion for lean fuel mixtures, mitigates engine knock, and provides for improved ignition response.

Additionally, it is also desirable to vary the volume of the prechamber based on other engine operating conditions in order to improve engine performance and decrease harmful emissions.

SUMMARY OF THE INVENTION

According to one exemplary aspect of the invention, a method of operating an internal combustion engine is provided. The engine includes a main combustion chamber that is in fluid communication with a prechamber. The method comprises the step of varying the volume within the prechamber during a portion of a compression stroke of the main combustion chamber.

According to another exemplary aspect of the invention, a method of igniting a fuel within a main combustion chamber of an internal combustion engine is provided. The main combustion engine comprises (1) a piston cylinder formed within an engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, (6) an ignition device configured to ignite a fuel within the prechamber, and (7) a prechamber piston configured to translate within the prechamber. Translation of the prechamber piston within the prechamber varies the volume within the prechamber. Additionally, the prechamber comprises at least one orifice that provides fluid communication between the prechamber and main combustion chamber. The method comprising the steps of supplying a fuel and air mixture to the main combustion chamber, compressing the fuel and air mixture within the main combustion chamber during a compression stroke of the primary piston to advance some of the fuel and air mixture into the prechamber via the at least one orifice, varying the volume within the prechamber during a portion of the compression stroke, igniting the fuel and air mixture in the prechamber with the ignition device, wherein the ignited fuel and air mixture in the prechamber jets into the main combustion chamber via the at least one orifice, and igniting the fuel and air mixture in the main combustion chamber with the jetted ignited fuel and air mixture from the prechamber.

According to yet another exemplary aspect of the invention, a method of igniting a fuel within a main combustion chamber of an internal combustion engine is provided. The main combustion engine comprises (1) a piston cylinder formed within an engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, (6) an ignition device configured to ignite a fuel within the prechamber, and (7) a prechamber piston configured to translate within the prechamber. Translation of the prechamber piston within the prechamber varies the volume within the prechamber. The prechamber comprises at least one orifice that provides fluid communication between the prechamber and main combustion chamber. The method comprises the steps of supplying a fuel and air mixture to the main combustion chamber and prechamber, urging prechamber piston toward the prechamber during a portion of the compression stroke, igniting the fuel and air mixture in the prechamber with the ignition device, wherein the ignited fuel and air mixture in the prechamber jets into the main combustion chamber via the at least one orifice, and igniting the fuel and air mixture in the main combustion chamber with the jetted ignited fuel and air mixture from the prechamber.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

FIG. 4 is a graph illustrating an exemplary ignition current as a function of engine crank angle during the compression and expansion strokes for a four-stroke engine, in accordance with the present invention;

FIG. 5 is a graph illustrating an exemplary prechamber volume as a function of the engine crank angle of FIG. 4; and FIG. 6 is a graph illustrating an exemplary prechamber temperature as a function of the engine crank angle of FIGS. 4 and 5.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
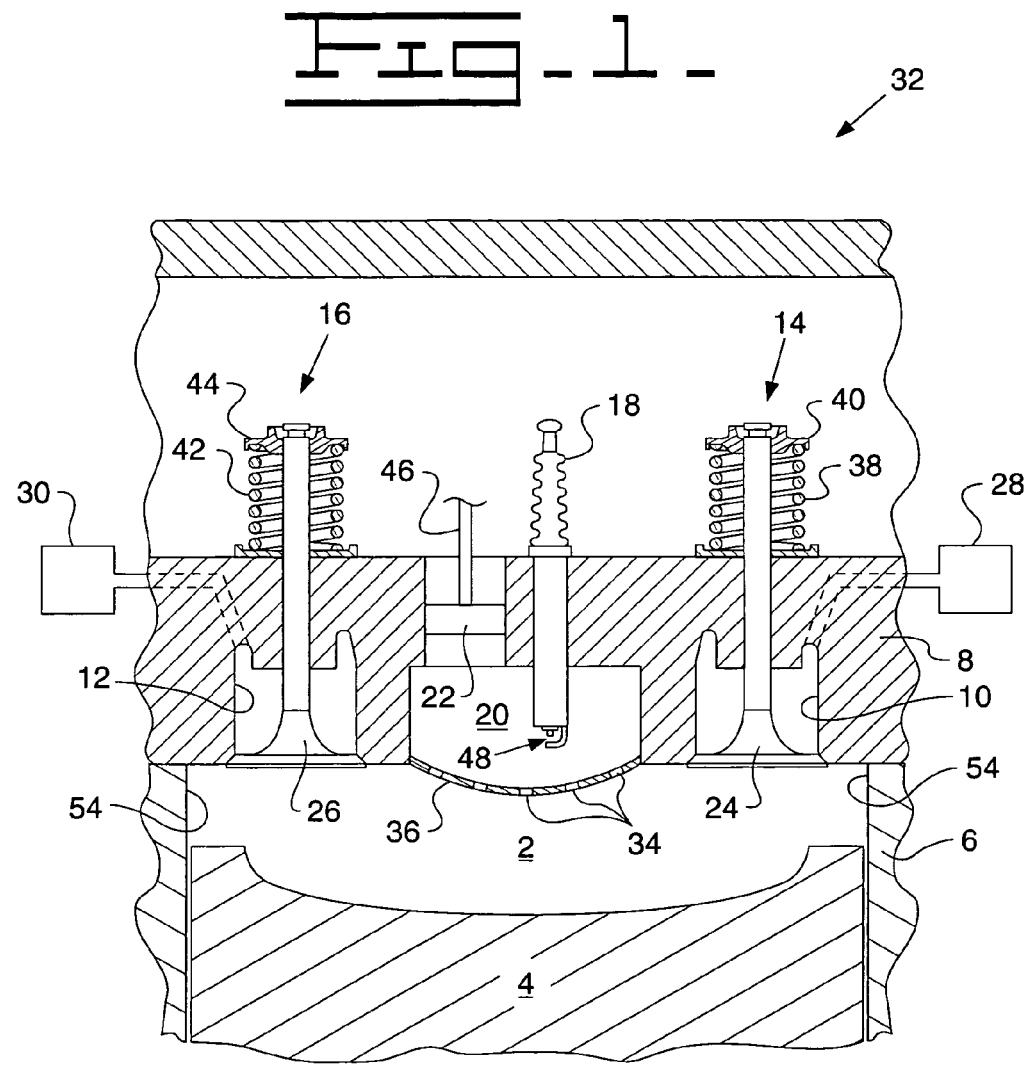
FIG. 1 is a diagrammatic sectional view of an exemplary main combustion chamber and prechamber in accordance with the invention.

Referring to FIG. 1, a portion of an exemplary internal combustion engine 32 is provided. The internal combustion engine 32 includes an engine block 6 defining at least one cylinder 54, the number of which varies depending on engine 32. For example, a 4-cylinder engine 32 would include four cylinders 54. It should be appreciated that engine 32 may be any type of spark-ignited internal combustion engine, such as a gasoline or natural gas engine.

Internal combustion engine 32 also includes an intake manifold 30 and an exhaust manifold 28. Intake manifold 30 provides fluid, such as an air or air/fuel mixture, to a main combustion chamber 2, which is partially defined within cylinder 54.

Internal combustion engine 32 also includes an engine head 8, a spark plug 18, a piston assembly 4, an intake valve assembly 16, and an exhaust valve assembly 14. Piston 4 translates within cylinder 54 to drive a crankshaft (not shown) in a known manner.

Piston 4, cylinder 54, and engine head 8 cooperate so as to define main combustion chamber 2. In particular, a bottom surface of engine head 8, an inner wall of cylinder 54, and a top surface of piston 4 cooperate to define the boundaries of main combustion chamber 2, as shown in FIG. 1. When fuel combusts in main combustion chamber 2, a downward force (as viewed in FIG. 1) is applied to the top surface of piston 4, such that piston 4 is urged downward so as to rotate the crankshaft of engine 32 to produce mechanical output.

Engine head 8 includes an intake port 12 and an exhaust port 10 defined therein. Intake valve assembly 16 controls the flow of fuel through intake port 12. In particular, intake valve assembly 16 includes valve member 26, a concentric valve spring 42, and rocker arm 44. Valve spring 42 biases valve member 26 to the closed and seated position, as depicted in FIG. 1. A camshaft (not shown) associated with internal combustion engine 32 selectively contacts rocker arm 44 so as to cause rocker arm 44 to move valve member 26 downward, as viewed in FIG. 1, thereby unseating valve 26 and placing valve 26 in an open position.

When valve 26 is positioned in the open position, intake port 12 is in fluid communication with main combustion chamber 2. In this embodiment, intake port 12 is also in fluid communication with a fuel source via intake manifold 30. When intake valve member 26 is positioned in its open position, fuel is advanced from intake manifold 30, through intake port 12, and into main combustion chamber 2. When valve member 26 is positioned in the closed position, intake port 12 is isolated from main combustion chamber 2. In operation and when valve member 26 is positioned in its open position, fuel advances from intake port 12 into main combustion chamber 2. If valve member 26 is in the closed position, as shown in FIG. 1, valve 26 prevents fuel from entering main combustion chamber 2 via intake port 12.

As shown in FIG. 1, engine 32 comprises prechamber 20, defined within head 8, prechamber member 36, and prechamber piston 22. Additionally, prechamber member 36 has at least one orifice 34 defined therein. Hence, when fuel advances into main combustion chamber 2 from intake port 12 in the manner described above, fuel advances into prechamber 20 via orifices 34.

The volume within prechamber 20 may vary depending on the position of prechamber piston 22. Prechamber piston 22 is mechanically connected to shaft 46, which urges piston 22 up and down, as viewed in FIG. 1. Shaft 46 and piston 22 may be actuated by any known configuration previously known. For example, a conventionally known hydraulic operator may be used to translate piston 22 up or down to increase or decrease, respectively, the volume of prechamber 20. Alternatively, a pneumatic or electrically-operated actuator may be used to translate piston 22 up and down.

Exhaust valve assembly 14 controls the flow of exhaust gases through exhaust port 10. Exhaust valve assembly 14 includes valve member 24, concentric valve spring 38, and rocker arm 40. Valve spring 38 biases valve member 24 upwardly (as viewed in FIG. 1) so as to keep valve member 24 seated in the closed position. The camshaft (not shown) associated with internal combustion engine 32 selectively contacts rocker arm 40 to move valve member 24 downward, thereby unseating valve member 24 and placing valve 24 in an open position.

When valve member 24 is in the open position, exhaust port 10 is in fluid communication with main combustion chamber 2. When valve member 24 is in the closed position, as depicted in FIG. 1, exhaust port 10 is isolated from main combustion chamber 2. When valve member 24 is open, exhaust gases may advance from main combustion chamber 2 into exhaust port 10. Likewise, fuel is prevented from exiting main combustion chamber 2 into exhaust port 10 when valve member 24 is closed.

As depicted in FIG. 1, exhaust port 10 is in fluid communication with exhaust manifold 28. When exhaust valve 24 is positioned in the open position, exhaust gases may advance from main combustion chamber 2 to exhaust manifold 28 via exhaust port 10.

Spark plug 18 is provided to ignite either enriched or non-enriched fuel within variable volume prechamber 20, which is in fluid communication with main combustion chamber 2. After the fuel in prechamber 20 ignites, a front of burning fuel is jetted or otherwise advanced through orifices 34 of prechamber member 36 and into main combustion chamber 2. The front of burning fuel entering main combustion chamber 2 ignites the fuel within main combustion chamber 2, thereby driving piston 4 downward (as viewed in FIG. 1) so as to rotate the crankshaft (not shown) of internal combustion engine 32 for producing mechanical output.

As shown in FIG. 1, variable volume prechamber 20 possesses a volume that is smaller than the volume of main combustion chamber 2. When piston 4 is positioned at top dead center 84 ("TDC") of its stroke, the volume of the prechamber 20, in this embodiment, is about 2% to about 10% of the volume of main combustion chamber 2, regardless of the position of piston 22.

Figure 3:
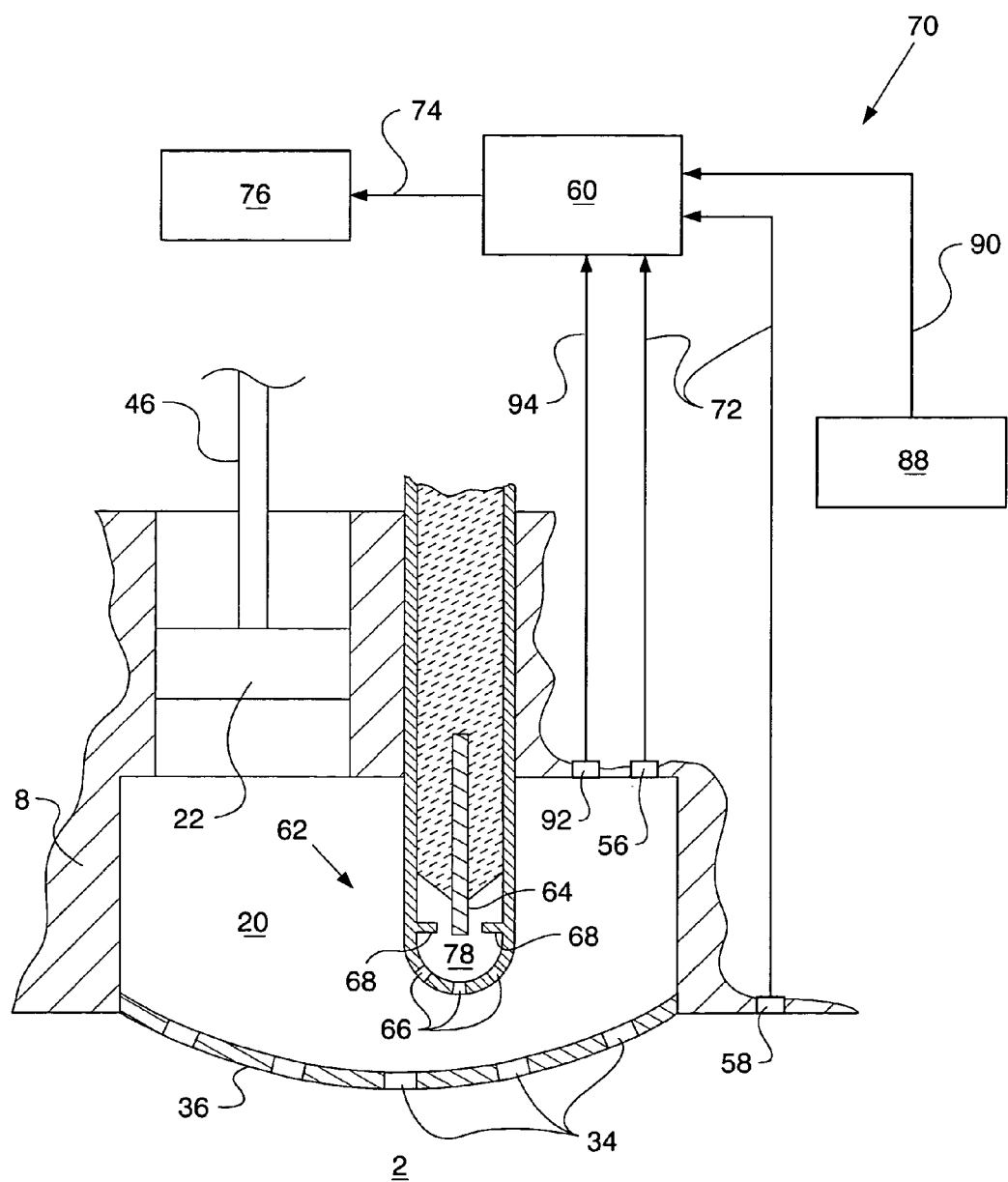
FIG. 3 is a combination diagrammatic and schematic illustration of an exemplary prechamber in accordance with the engine.

Spark plug 18 may be a typical J-gap spark plug, rail plug, extended electrode, or laser plug, for example. Spark plug 18, in the exemplary embodiment of FIG. 3, is an encapsulated spark plug 62. Examples of some encapsulated spark plugs 62 are described in U.S. Pat. Nos. 4,987,868, 5,105,780, and 5,947,076.

In the embodiment depicted in FIG. 1, spark plug gap 48 is positioned towards the bottom half of prechamber 20. Positioning gap 48 closer to prechamber member 36 may result in improved fuel ignition within prechamber 20.

Figure 2:
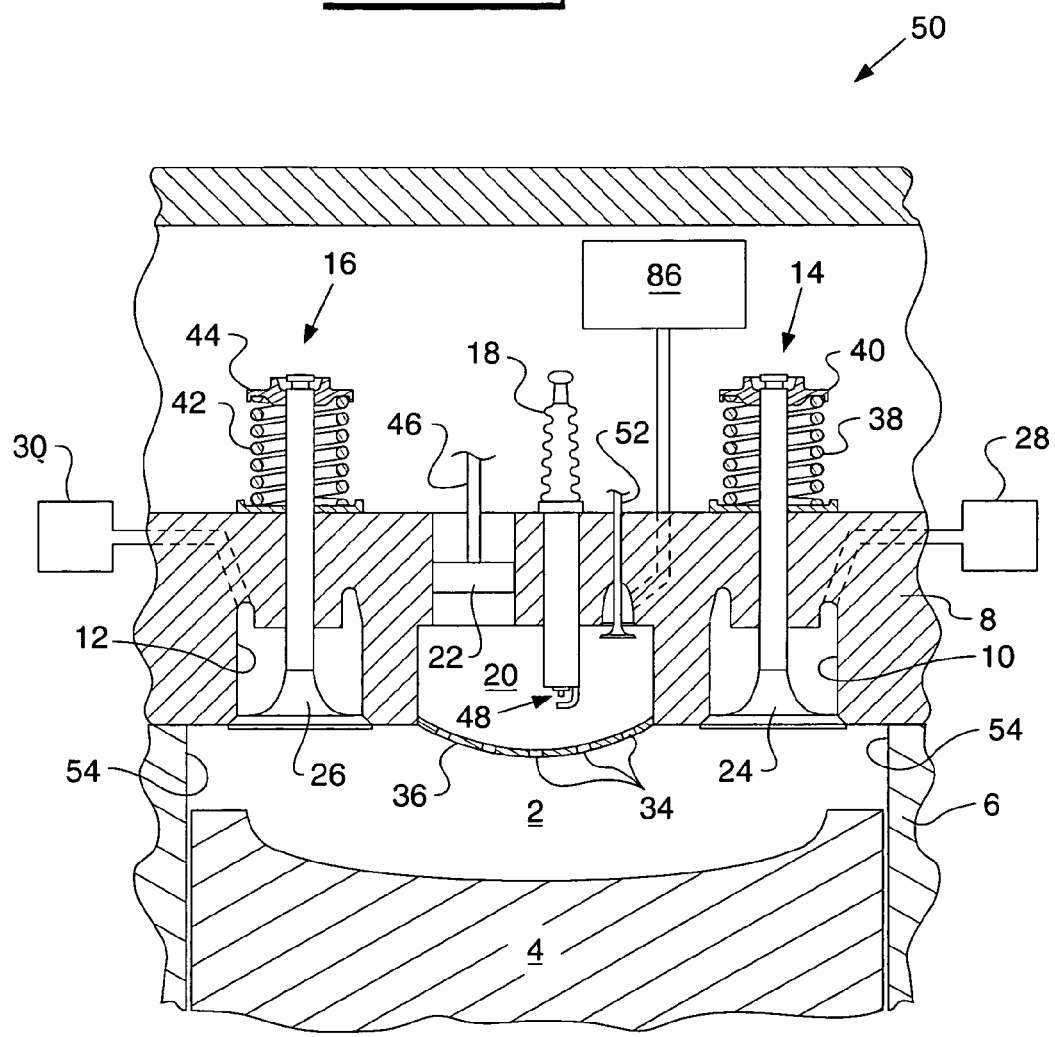
FIG. 2 is a diagrammatic sectional view of an exemplary main combustion chamber and prechamber in accordance with the invention.

Now referring to FIG. 2, a portion of a second exemplary embodiment of internal combustion engine 50 is provided. In this embodiment, the engine 50 assembly is similar to the engine 32 assembly of FIG. 1. As such, many of the reference numerals used in FIG. 1 are also used in FIG. 2.

One difference between the embodiment of FIG. 2 and the embodiment of FIG. 1, however, is the presence of a prechamber intake valve 52 and fuel source 86 in the embodiment of FIG. 2. Prechamber intake valve 52 may take many configurations. For example, intake valve 52 may be configured as a check valve that allows enriched fuel to flow through and into prechamber 20 during the intake stroke of piston 4.

In one embodiment of FIG. 2, engine control module 60 (shown only in FIG. 3) is electrically connected to both intake valve 52 and spark plug 18. Control module 60 selectively generates an output signal that causes intake valve 52 to position in the open position, thereby allowing enriched or non-enriched fuel to advance from fuel source 86 and into prechamber 20. Alternatively, the prechamber intake valve 52 assembly may comprise a concentric valve spring and rocker arm, similar to rocker arm 44 and valve spring 42 of valve assembly 16, for opening intake valve 52 during a portion of the intake stroke of piston 4.

Once fuel (enriched or non-enriched) advances into prechamber 20, engine control module 60 selectively generates an output signal that causes spark plug 18 to create a spark in spark plug gap 48. The spark ignites the fuel within prechamber 20, which causes a front of burning fuel to jet through orifices 34 and into main combustion chamber 2. The front of burning fuel entering main combustion chamber 2 ignites the fuel within chamber 2, thereby driving piston 4 downward, as viewed from FIG. 2, so as to rotate the crankshaft (not shown) of engine 50 for producing mechanical output.

Now referring to FIG. 3, a portion of a third exemplary embodiment of engine 70 is shown. In this embodiment, an encapsulated spark plug 62 is used for igniting the fuel in prechamber 20, which ignites the fuel in main combustion chamber 2, as discussed below.

Encapsulating spark plugs 62, such as multi-jet encapsulated spark plugs or multi-torch encapsulated spark plugs, have plug combustion chambers 78 defined therein. Both the center electrode 64 and ground electrodes 68 are positioned within plug combustion chamber 78. Encapsulated spark plug 62 also has at least one orifice 66 that provide fluid communication between plug combustion chamber 78 and variable volume prechamber 20.

As discussed above with FIGS. 1 and 2, fuel advances into main combustion chamber 2 from intake port 12. In at least some embodiments, fuel then advances into prechamber 20 via orifices 34, and thereafter into plug combustion chamber 78 via orifices 66. In this embodiment, the fuel within prechamber 20 is not enriched, but rather has the same air-to-fuel ratio as the fuel within main combustion chamber 2.

It should be understood, however, that an encapsulated spark plug 62 may also be used with the embodiment of FIG. 2. In such an embodiment, either non-enriched or enriched fuel—which may have a different air-to-fuel ratio as the fuel in main combustion chamber 2—may advance in prechamber 20 from fuel source 86 and, thereafter, advance into plug combustion chamber 78 via orifices 66.

In one embodiment that includes an encapsulated spark plug 62, the volume of plug combustion chamber 78 is about 0.1% to about 10% of the volume of prechamber 20.

As shown in FIG. 3, engine control module 60 of engine 70 is configured to send a control signal 74 to prechamber piston 22 controller 76. Controller 76 controls the position of piston 22 within prechamber 20 by any known configuration, including using hydraulic, mechanical, pneumatic, and electric actuators, for example.

Engine control module 60 is electrically coupled to pressure transducers 58 and 56. Pressure transducer 56 measures the pressure within prechamber 20 and pressure transducer 58 measures the pressure within main combustion chamber 2. Once measured by transducers 56 and 58, electric signals 72, which correspond to the measured pressures, are sent to engine control module 60.

INDUSTRIAL APPLICABILITY

Referring to FIG. 1, in operation, the camshaft (not shown) associated with engine 32 contacts rocker arm 44 of intake valve assembly 16 so as to cause rocker arm 44 to urge intake valve 26 downward, thus placing valve 26 in the open position. Fuel is then advanced from intake manifold 30 through intake port 12 and into main combustion chamber 2. Afterward, fuel advances from chamber 2 into prechamber 20 via orifices 34 (and thereafter plug combustion chamber 78 via orifices 66 if an encapsulated spark plug 62 is used).

Once fuel advances into main combustion chamber 2, prechamber 20, and plug combustion chamber 78 (if used), engine control module 60 (shown in FIG. 3) selectively generates an output signal that causes spark plug 18 to create a spark in spark gap 48. This spark ignites the fuel within prechamber 20 (or plug combustion chamber 78). Ignition of fuel within prechamber 20 causes a front of burning fuel to jet or otherwise advance through orifices 34 and into main combustion chamber 2. The front of burning fuel entering main combustion chamber 2 ignites the fuel within main combustion chamber 2, thereby driving piston 4 downward, as viewed in FIG. 1, so as to rotate the crankshaft (not shown) of engine 32.

If an encapsulated spark plug 62 is used in this embodiment, generation of a spark ignites the fuel within plug combustion chamber 78, causing a first front of burning fuel to jet or otherwise advance through orifices 66 and into prechamber 20. This first front of burning fuel ignites the fuel within prechamber 20, thereby causing a second, larger front of burning fuel to jet or otherwise advance through orifices 34 and into main combustion chamber 2, which ignites the fuel in chamber 2 thus urging piston 4 downward.

Referring to FIG. 2, the camshaft (not shown) associated with engine 50 contacts rocker arm 44 of intake valve assembly 16 so as to cause rocker arm 44 to urge intake valve 26 downward, thus placing valve 26 in the open position. Fuel is then advanced from intake manifold 30 through intake port 12 and into main combustion chamber 2.

Before, after, or during the advancement of fuel into main combustion chamber 2, fuel may also advance from fuel source 86 to prechamber 20 via prechamber intake valve 52. In one embodiment, engine control module 60 (shown in FIG. 3) generates an output signal that causes prechamber intake valve 52 to open, which allows fuel from fuel source 86 to enter prechamber 20 (and, thereafter, plug combustion chamber 78 via orifices 66 if an encapsulated spark plug 62 is used).

Once fuel advances into main combustion chamber 2, prechamber 20, and plug combustion chamber 78 (if used), engine control module 60 (shown in FIG. 3) selectively generates an output signal that causes spark plug 18 or 62 to create a spark in spark gap 48. This spark ignites the fuel within prechamber 20 (or plug combustion chamber 78). Ignition of fuel within prechamber 20 causes a front of burning fuel to jet or otherwise advance through orifices 34 and into main combustion chamber 2. The front of burning fuel entering main combustion chamber 2 ignites the fuel within main combustion chamber 2, thereby driving piston 4 downward, as viewed in FIG. 1, so as to rotate the crankshaft (not shown) of engine 50.

As with the embodiment of FIG. 1, if an encapsulated spark plug 62 is used in the embodiment of FIG. 2, ignition of a spark within plug 62 ignites the fuel within plug combustion chamber 78, causing a first front of burning fuel to jet or otherwise advance through orifices 66 and into prechamber 20. This first front of burning fuel ignites the fuel within prechamber 20, thereby causing a second, larger front of burning fuel to jet or otherwise advance through orifices 34 and into main combustion chamber 2, which ignites the fuel in chamber 2 thus urging piston 4 downward.

Referring now to FIG. 3, fuel may be advanced into prechamber 20 and plug combustion chamber 78 in a manner similar to those discussed above with respect to FIGS. 1 and 2.

In one embodiment, pressure transducers 56 and 58 measure the pressure within prechamber 20 and main combustion chamber 2, respectively. Engine control module 60 receives these measured pressures via electronic control signals 72 for controlling prechamber piston 22 position via controller 76.

In another embodiment, the temperature in prechamber 20 is measured by measuring device 92. Measuring device 92 may be any known temperature-measuring device, such as a resistance-temperature-detector, for example. An electronic signal 94 may then be sent to engine control module 60 from device 92. Engine control module 60 may then control the position of piston 22 via controller 76 based on the temperature within prechamber 20.

Controller 76 receives input from engine control module 60 via electronic control signal 74 for positioning prechamber piston 22. Controller 76 may control prechamber piston 22 with any known method, including hydraulically, mechanically, electrically, or pneumatically, for example.

In at least one embodiment, controller 76 raises prechamber piston 22 upward, as viewed from FIG. 3, if the pressure in prechamber 20 is too high.

In one embodiment, control module 60 sends signal 74 to controller 76 for raising prechamber piston 22 upward on receipt of an increase in engine speed or engine load. In this embodiment, controller 60 receives electronic control signal 90, which relays the measured engine speed or engine load from measuring device 88. Measuring device 88 may be any device used to measure engine speed or engine load.

As engine speed (or load) increases, controller 76 raises prechamber piston 22 upward, as viewed from FIG. 3. Similarly, during low idle speed of engine 32, 50, and 70, piston 22 may be at a downward position, as viewed from FIGS. 1–3, which results in prechamber 20 as having a relatively small volume. During high engine load, on the other hand, piston 22 may be positioned in the upward position, which results in prechamber 20 as having a relatively large volume.

Now referring to FIGS. 4–6, an embodiment of the invention is shown that illustrates a control strategy used for positioning prechamber piston 22 via controller 76 (shown in FIG. 3). FIGS. 4–6 illustrate ignition current, prechamber 20 volume, and prechamber 20 temperature, respectively, as a function of the same engine crank angle during the compression stroke 80 and expansion stroke 82 of a four-stroke engine.

In this embodiment, spark plug 18 or 62 ignites at about 20 degrees before TDC 84 and during compression stroke 80, as shown in FIG. 4. After ignition, residual ignition current dissipates into the remainder of compression stroke 80 and into expansion stroke 82.

As depicted in FIG. 5, during a portion of compression stroke 80, prechamber piston 22 translates downward (if viewed from the perspective of FIGS. 1–3) to contract prechamber 20 volume.

In the embodiment depicted in FIG. 5, prechamber piston 22 then translates upward (if viewed from the perspective of FIGS. 1–3), thus expanding prechamber 20 volume, during a portion of expansion stroke 82.

The temperature of prechamber 20 during compression stroke 80 and expansion stroke 82 is depicted in FIG. 6. As shown, the volume within prechamber 20 decreases during a portion of compression stroke 80, which results in an increase in temperature within prechamber 20. This increase in temperature is in addition to the increase in temperature that results during compression of main combustion chamber 2 from piston 4.

Raising the temperature in prechamber 20, as discussed above, may advantageously improve flame ignition stability. Some leaner fuel mixtures will not ignite within prechamber 20 if the temperature within prechamber 20 is too low.

It will be apparent to those skilled in the art that various modifications and variations can be made in the disclosed internal combustion engine 32, 50, and 70 with variable volume prechamber 20 without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of operating an internal combustion engine including a main combustion chamber in fluid communication with a prechamber, the method comprising:
   varying the volume within the prechamber during a portion of a compression stroke of the main combustion chamber;
   contracting the volume within the prechamber during a portion of the compression stroke; and
   igniting a fuel and air mixture within the main combustion chamber with an ignition device.

2. A method of operating an internal combustion engine including a main combustion chamber in fluid communication with a prechamber, the method comprising:
   varying the volume within the prechamber during a portion of a compression stroke of the main combustion chamber;
   expanding the volume within the prechamber during a portion of an expansion stroke of the main combustion chamber; and
   igniting a fuel and air mixture within the main combustion chamber with an ignition device.

3. A method of operating an internal combustion engine including a main combustion chamber in fluid communication with a prechamber, the method comprising:
   varying the volume within the prechamber during a portion of a compression stroke of the main combustion chamber;
   igniting a fuel and air mixture within the main combustion chamber with an ignition device;
   translating the prechamber piston to contract the volume within the prechamber during a portion of the compression stroke of the main combustion chamber; and
   translating the prechamber piston to expand the volume within the prechamber during a portion of an expansion stroke of the main combustion chamber.

4. A method of igniting a fuel within a main combustion chamber of an internal combustion engine, wherein the internal combustion engine comprises (1) a piston cylinder formed within an engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, characterized in that the prechamber comprises at least one orifice that provides fluid communication between the prechamber and main combustion chamber, (6) an ignition device configured to ignite a fuel within the prechamber, and (7) a prechamber piston configured to translate within the prechamber, wherein translation of the prechamber piston within the prechamber varies the volume within the prechamber, the method comprising the steps of:
   supplying a fuel and air mixture to the main combustion chamber;
   compressing the fuel and air mixture within the main combustion chamber during a compression stroke of the primary piston to advance some of the fuel and air mixture into the prechamber via the at least one orifice;
   varying the volume within the prechamber during a portion of the compression stroke;
   contracting the volume within the prechamber during a portion of the compression stroke of the main combustion chamber;
   igniting the fuel and air mixture in the prechamber with the ignition device, wherein the ignited fuel and air mixture in the prechamber jets into the main combustion chamber via the at least one orifice; and
   igniting the fuel and air mixture in the main combustion chamber with the jetted ignited fuel and air mixture from the prechamber.

5. A method of igniting a fuel within a main combustion chamber of an internal combustion engine, wherein the internal combustion engine comprises (1) a piston cylinder formed within an engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, characterized in that the prechamber comprises at least one orifice that provides fluid communication between the prechamber and main combustion chamber, (6) an ignition device configured to ignite a fuel within the prechamber, and (7) a prechamber piston configured to translate within the prechamber, wherein translation of the prechamber piston within the prechamber varies the volume within the prechamber, the method comprising the steps of:
   supplying a fuel and air mixture to the main combustion chamber;
   compressing the fuel and air mixture within the main combustion chamber during a compression stroke of the primary piston to advance some of the fuel and air mixture into the prechamber via the at least one orifice;
   varying the volume within the prechamber during a portion of the compression stroke;
   expanding the volume within the prechamber during a portion of an expansion stroke of the main combustion chamber;
   igniting the fuel and air mixture in the prechamber with the ignition device, wherein the ignited fuel and air mixture in the prechamber jets into the main combustion chamber via the at least one orifice; and
   igniting the fuel and air mixture in the main combustion chamber with the jetted ignited fuel and air mixture from the prechamber.

6. A method of igniting a fuel within a main combustion chamber of an internal combustion engine, wherein the internal combustion engine comprises (1) a piston cylinder formed within an engine block (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, characterized in that the prechamber comprises at least one orifice that provides fluid communication between the prechamber and main combustion chamber, (6) an ignition device configured to ignite a fuel within the prechamber, and (7) a prechamber piston configured to translate within the prechamber, wherein translation of the prechamber piston within the prechamber varies the volume within the prechamber, the method comprising the steps of:
   supplying a fuel and air mixture to the main combustion chamber;
   compressing the fuel and air mixture within the main combustion chamber during a compression stroke of the primary piston to advance some of the fuel and air mixture into the prechamber via the at least one orifice;
   varying the volume within the prechamber during a portion of the compression stroke;

translating the prechamber piston to contract the volume within the prechamber during a portion of the compression stroke of the main combustion chamber;

translating the prechamber piston to expand the volume within the prechamber during a portion of an expansion stroke of the main combustion chamber;

igniting the fuel and air mixture in the prechamber with the ignition device wherein the ignited fuel and air mixture in the prechamber jets into the main combustion chamber via the at least one orifice; and igniting the fuel and air mixture in the main combustion chamber with the jetted ignited fuel and air mixture from the prechamber.

7. A method of igniting a fuel within a main combustion chamber of an internal combustion engine, wherein the main combustion engine comprises (1) a piston cylinder formed within an engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, characterized in that the prechamber comprises at least one orifice that provides fluid communication between the prechamber and main combustion chamber, (6) an ignition device configured to ignite a fuel within the prechamber, and (7) a prechamber piston configured to translate within the prechamber, wherein translation of the prechamber piston within the prechamber varies the volume within the prechamber, the method comprising the steps of:

supplying a fuel and air mixture to the main combustion chamber and prechamber;

urging prechamber piston toward the prechamber during a portion of the compression stroke;

igniting the fuel and air mixture in the prechamber with the ignition device, wherein the ignited fuel and air mixture in the prechamber jets into the main combustion chamber via the at least one orifice; and igniting the fuel and air mixture in the main combustion chamber with the jetted ignited fuel and air mixture from the prechamber.

8. The method of claim 7, further comprising the step of urging prechamber piston away from the prechamber during a portion of the expansion stroke.

9. A method of igniting a fuel within a main combustion chamber of an internal combustion engine, wherein the internal combustion engine comprises (1) a piston cylinder formed within the engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, (6) an ignition device configured to ignite the fuel within the main combustion chamber, and (7) a prechamber piston configured to translate within the prechamber, wherein translation of the prechamber piston within the prechamber varies the volume within the prechamber, the method comprising the steps of:

supplying a fuel and air mixture to the main combustion chamber;

compressing the fuel and air mixture within the main combustion chamber during a compression stroke of the primary piston;

varying the volume within the prechamber during a portion of the compression stroke of the primary piston;

contracting the volume within the prechamber during a portion of the compression stroke of the main combustion chamber; and igniting the fuel and air mixture within the ignition device.

10. A method of igniting a fuel within a main combustion chamber of an internal combustion engine wherein the internal combustion engine comprises (1) a piston cylinder formed within the engine block, (2) an engine head secured to the engine block, (3) a primary piston configured to slide within the piston cylinder, (4) a main combustion chamber that is defined by the primary piston, piston cylinder, and engine head, (5) a variable volume prechamber formed within the engine head and in fluid communication with the main combustion chamber, (6) an ignition device configured to ignite the fuel within the main combustion chamber, and (7) a prechamber piston configured to translate within the prechamber, wherein translation of the prechamber piston within the prechamber varies the volume within the prechamber, the method comprising the steps of:

supplying a fuel and air mixture to the main combustion chamber;

compressing the fuel and air mixture within the main combustion chamber during a compression stroke of the primary piston;

expanding the volume within the prechamber during a portion of an expansion stroke of the main combustion chamber;

varying the volume within the prechamber during a portion of the compression stroke of the primary piston; and igniting the fuel and air mixture within the ignition device.

11. A method of igniting a fuel within a main combustion chamber of an internal combustion engine wherein the internal combustion engine comprises (1) a piston cylinder formed within the engine block, (2) an engine head secured to the engine block, (3) a primary piston configured to slide within the piston cylinder, (4) a main combustion chamber that is defined by the primary piston, piston cylinder, and engine head (5) a variable volume prechamber formed within the engine head and in fluid communication with the main combustion chamber, (6) an ignition device configured to ignite the fuel within the main combustion chamber, and (7) a prechamber piston configured to translate within the prechamber, wherein translation of the prechamber piston within the prechamber varies the volume within the prechamber, the method comprising the steps of:

supplying a fuel and air mixture to the main combustion chamber;

compressing the fuel and air mixture within the main combustion chamber during a compression stroke of the primary piston;

varying the volume within the prechamber during a portion of the compression stroke of the primary piston;

translating the prechamber piston to contract the volume within the prechamber during a portion of the compression stroke of the main combustion chamber;

translating the prechamber piston to expand the volume within the prechamber during a portion of an expansion stroke of the main combustion chamber; and igniting the fuel and air mixture within the ignition device.

* * * * *